United States Patent
Antraygue (10) Patent No.: US 8,991,771 B2
(45) Date of Patent: Mar. 31, 2015

(54) PILOTING DEVICE FOR PILOTING AN AIRCRAFT HAVING A PROTECTED FORCE SENSOR

(71) Applicant: Ratier Figeac, Figeac (FR)

(72) Inventor: Cedric Antraygue, Figeac (FR)

(73) Assignee: Ratier Figeac, Figeac (FR)

( * ) Notice: Subject to any disclaimer, the term of this patent is extended or adjusted under 35 U.S.C. 154(b) by 80 days.

(21) Appl. No.: 13/794,847

(22) Filed: Mar. 12, 2013

(65) Prior Publication Data

US 2013/0256463 A1    Oct. 3, 2013

(30) Foreign Application Priority Data

Mar. 27, 2012 (FR) ...................... 12 00906

(51) Int. Cl.
 *B64C 13/04* (2006.01)
 *G05G 5/04* (2006.01)
 *G05G 9/047* (2006.01)

(52) U.S. Cl.
 CPC *B64C 13/04* (2013.01); *G05G 5/04* (2013.01); *G05G 9/047* (2013.01)
 USPC ........................................................ 244/234

(58) Field of Classification Search
 USPC .................. 244/220, 221, 234, 236; 345/161; 463/38; 74/471 XY
 See application file for complete search history.

(56) References Cited

U.S. PATENT DOCUMENTS

| | | | |
|---|---|---|---|
| 2,888,635 A * | 5/1959 | Volk | .......................... 340/870.32 |
| 2,934,292 A | 4/1960 | Visser | |
| 3,447,766 A | 6/1969 | Palfreyman | |
| 3,653,612 A | 4/1972 | Palfreyman | |
| 3,676,818 A * | 7/1972 | Oliver | ............................... 338/2 |
| 3,729,990 A * | 5/1973 | Oliver | ........................ 73/862.05 |
| 3,832,895 A * | 9/1974 | Strandh | ...................... 73/862.05 |
| 4,437,351 A * | 3/1984 | McGrann et al. | .......... 73/862.05 |
| 5,264,768 A * | 11/1993 | Gregory et al. | ............... 318/561 |
| 6,189,401 B1 * | 2/2001 | Atwell et al. | ............. 74/471 XY |
| 8,050,780 B2 | 11/2011 | Tessier et al. | |
| 8,659,257 B2 * | 2/2014 | Antraygue | ............... 318/568.16 |
| 2009/0213073 A1 * | 8/2009 | Obermeyer et al. | ........... 345/161 |
| 2011/0108673 A1 * | 5/2011 | Antraygue | ..................... 244/228 |

FOREIGN PATENT DOCUMENTS

| | | |
|---|---|---|
| FR | 2 106 302 | 4/1972 |
| GB | 687 823 A | 2/1953 |
| JP | 10-059293 A | 3/1998 |

OTHER PUBLICATIONS

French Search Report, dated Dec. 11, 2012, from corresponding French application.

* cited by examiner

*Primary Examiner* — Joseph W Sanderson
(74) *Attorney, Agent, or Firm* — Young & Thompson (57) ABSTRACT

A piloting device for piloting an aircraft includes a piloting member (11), a mechanism (13) for mounting and guiding in rotation the piloting member about at least one rotation axis with respect to a frame (12), stops (25, 26, 35) arranged so as to cooperate with bearing surfaces (32) integral with the piloting member upstream of the mechanism in order to limit the rotation amplitude thereof, and at least one force sensor (19), these being arranged with respect to one another so that each contact of a bearing surface (32) with a stop (25, 26, 35) generates an abutment reaction, the orientation of which with respect to each deformable sensing element of each force sensor is such that it stresses this deformable sensing element at least substantially outside its deformation modes.

13 Claims, 5 Drawing Sheets

PILOTING DEVICE FOR PILOTING AN AIRCRAFT HAVING A PROTECTED FORCE SENSOR

FIELD OF THE INVENTION

The invention relates to a piloting device for piloting an aircraft comprising a piloting member suitable for being actuated by a pilot, a mechanism for mounting and guiding in rotation the piloting member about at least one rotation axis—in particular on a centre-point rotary joint defined by two at least substantially orthogonal pivot axes or by a ball joint—with respect to a fixed frame of the aircraft.

Throughout the text, the term "piloting" and its derivatives denote, unless otherwise stated, the flying of an aircraft by a human pilot operating at least one piloting member such as a stick, handle, rudder bar, pedal, etc. The terms "downstream" and "upstream" are used in reference to the direction of the kinematic chain going from the piloting member towards a flying member (control surface, engine(s), etc.) of the aircraft controlled from the piloting member. The term "tangential" and its derivatives, with respect to a rotation axis, denotes a plane orthogonal to a direction radial to the rotation axis, or a direction orthogonal to a direction radial to the rotation axis. The expression "centre-point rotary joint" denotes any joint allowing rotations about a fixed point, and therefore includes ball or spherical joints, joints with axes at least substantially orthogonal and intersecting, cardan joints, etc. The expression "at least substantially" indicates, in the usual fashion, that a structural characteristic such as a value or functional characteristic must not be taken as marking an abrupt discontinuity, which would not make sense physically, but covers not only this structure or this function, but also slight variations of this structure or of this function which produce, in the technical context considered, an effect of the same nature, if not of the same degree.

BACKGROUND OF THE INVENTION

Traditionally, a piloting device for piloting an aircraft comprises at least one piloting member connected, at least partially by a kinematic chain, to at least one flying member—in particular a control surface, an engine, etc.—of the aircraft, and possibly at least one motorised actuator, called a parallel actuator, having a driving member coupled in parallel in the kinematic chain so as to enable automatic piloting and/or to simulate a specific dynamic behaviour of the piloting member to bring about a return to neutral and create appropriate sensations (in particular muscular force sensations) enabling or facilitating the piloting by a human pilot.

The traditional, mechanically controlled, piloting devices comprise a kinematic chain connecting the piloting members to the flying members completely mechanically. Typically, the kinematic chain has a rod and/or articulation and/or slide linkage, enabling transmission of the displacement commands and the forces mechanically (possibly with amplification) between the piloting member and each flying member. Such piloting devices with completely mechanical control are still widely used in numerous aircrafts (small-size aeroplanes, helicopters, etc.).

Piloting devices with electrical flight controls, in which the flying members are not connected entirely mechanically by a kinematic chain to the piloting members have been developed for piloting certain aircrafts. These piloting devices with electrical flight controls have a partial kinematic chain comprising at least one mechanism for mounting and guiding each piloting member mounted and guided with respect to a frame integral with the aircraft, and having a set of position and/or force sensors connected to flight control computers generating control signals for a servo control with electrical input actuating one or more flying members.

In the particular case of a mini-stick for piloting aircraft, the piloting member is mounted and guided in rotation on two pivot joints with axes at least substantially orthogonal and intersecting (thus forming a centre-point rotary joint) making it possible to impart pitch and roll movements.

Such a piloting device generally comprises at least one force sensor measuring at least one component of the forces in the piloting device, by deformation of at least one deformable sensing element of the force sensor. Such a force sensor makes it possible, in particular, to carry out test flights, and supplies signals which are useful in the automatic actions associated with such piloting devices, for example for the coupling of a plurality of piloting members of the aircraft, and/or for delivering signals to an electronic device for operational control of the piloting device, and/or for the operation of the autopilot, and/or for control of motors associated with the degrees of freedom of the piloting member so as to achieve an electrically simulated variable force feedback sensation.

That being so, the aircraft piloting devices must be able to be subjected, for their certification, to maximum certification forces, the value of which is much higher than the nominal operational value of the forces during actual piloting of the aircraft. Typically, the value of the maximum certification forces is ten times greater than the nominal operational value. These certification forces are applied when the piloting member is placed in abutment with respect to the frame on one side or the other.

In order for the measurement of the forces to be as precise as possible, however, it is advisable to optimise the force sensor for the operational values of the forces applied in the piloting device, but not necessarily for the value of the certification forces. Thus, it must be possible to choose the force sensor so that it can have a measuring range covering the maximum operational value of the forces with a certain safety coefficient. In practice, the force sensor is chosen such that it can withstand 150% to 200% of the maximum operational value. In these conditions, it is advisable to avoid subjecting the force sensor directly to the value of the certification forces, which is liable to cause damage to or even destruction of the force sensor.

In certain known piloting devices (cf. for example JP 10059293) the force sensor is arranged in the kinematic chain downstream of the mechanism for mounting the piloting member, and the stops limiting the angular deflection of the piloting member are arranged between the force sensor and the piloting member. In these devices, the force sensor is isolated from the reaction forces when the piloting member is in abutment. This architecture nevertheless has the major disadvantage of not measuring the frictional forces developed in the mechanism for mounting and guiding the piloting member.

In other known piloting devices (cf. for example U.S. Pat. No. 8,050,780) the force sensor is arranged upstream of the mechanism for mounting the piloting member. With these known devices, the application of the certification forces requires a specific additional stop to be added in the region of the force sensor in order to avoid damage thereto. Such an assembly is, however, complex (therefore less reliable), bulky, heavy and costly.

SUMMARY OF THE INVENTION

The invention therefore aims to overcome all of these disadvantages by proposing a piloting device which, on the one hand, enables measurement of the forces with precision, including by taking into consideration the forces and frictions of the mechanism for mounting and guiding in rotation the piloting member, and, on the other hand, can be subjected to the certification tests without requiring specific additional stops to be added other than those strictly necessary for limiting the deflection of the piloting member.

The invention also aims to achieve these objectives in a simple manner, at low cost, without increasing the space requirement and the weight of the piloting device.

To achieve this, the invention relates to a piloting device for piloting an aircraft comprising:
- a piloting member suitable for being actuated by a pilot,
- a mechanism for mounting and guiding in rotation the piloting member about at least one rotation axis with respect to a frame,
- stops adapted to limit the angular amplitude of rotation of the piloting member with respect to the frame,
- at least one force sensor connected to the piloting member upstream of said mechanism, and comprising at least one sensing element deformable according to modes of deformation corresponding to the measurement of at least one component of the forces imparted by a pilot on the piloting member, wherein:
said stops are arranged so as to cooperate with bearing surfaces integral with the piloting member upstream of said mechanism, each force sensor, said stops and said bearing surfaces are arranged with respect to one another so that each contact of a bearing surface with a stop generates an abutment reaction, the orientation of which with respect to each deformable sensing element of each force sensor is such that said abutment reaction stresses this deformable sensing element at least substantially outside its deformation modes.

Thus, each deformable sensing element of each sensor is not subjected substantially to the abutment reaction according to its deformation modes, and does not measure this abutment reaction, which is not liable to damage said deformable sensing element. Consequently, it is possible to choose each force sensor optimally with respect to the measurement of the expected operational values of the forces, without risk of the force sensor being subjected to the abutment reactions of much higher values imparted in the context of the certification of the piloting device. And this result is obtained in an extremely simple manner, without overload or extra cost, without requiring the addition of a specific overload stop.

In an advantageous embodiment, a device according to the invention is also characterised in that it has a force sensor with a flexurally deformable membrane which is overall plane at rest and extends tangentially with respect to at least one rotation axis of the piloting member, in that said stops and said bearing surfaces are arranged so as to come into contact with one another in contact zones situated in a plane containing the plane of said membrane, and in that said stops and said bearing surfaces are oriented so as to produce abutment reactions oriented in the plane of said membrane, i.e. tangentially with respect to the rotation axis. Thus, said flexurally deformable membrane is subjected to the abutment reaction in longitudinal compression/shearing, deformation modes for which it exhibits a sufficiently large moment of inertia to be able to be subjected to very high values of the abutment reaction without damage.

In particular, advantageously and according to the invention, for each rotation axis, each stop and/or the corresponding bearing surface of the piloting member has a face extending in a plane parallel to the rotation axis. Thus, the abutment reaction is oriented tangentially with respect to the rotation axis (i.e. orthogonally to a direction radial to the rotation axis), and therefore in the plane of the membrane. In a preferred embodiment, each stop and the corresponding bearing surface are both plane faces coming into contact with one another when the piloting member is angularly displaced to the maximum, these two plane faces extending in a plane parallel to a plane radial to the rotation axis and containing the rotation axis (axial radial plane).

Furthermore, advantageously and according to the invention, each bearing surface is a peripheral wall portion of the force sensor. There is nothing to prevent provision, in a variant, for the bearing surface to be formed by a specific part, distinct from the force sensor, integral with the piloting member in the region of the force sensor.

Advantageously and according to the invention, said mechanism is adapted to define a centre-point rotary joint, in particular chosen from a ball-joint rotary joint and a rotary joint with two rotation axes at least substantially orthogonal and at least substantially intersecting—especially strictly orthogonal and intersecting—. The invention applies, in particular, advantageously to a piloting device in which said mechanism is adapted to define a rotary joint on two rotation axes at least substantially orthogonal with respect to the frame.

Advantageously, such a piloting device according to the invention has a force sensor adapted to measure the forces according to the different rotation movements of the piloting member, this force sensor being interposed between the piloting member and said mechanism. The force sensor is in particular adapted to measure the forces of the piloting member on the two rotation axes, i.e. pitch and roll, when said mechanism comprises two at least substantially orthogonal rotation axes, one pitch, the other roll.

The invention applies more particularly and advantageously to a piloting device constituted by an aircraft mini-stick. It nevertheless also applies to other piloting members for which the same problems arise.

The invention extends to an aircraft comprising at least one piloting device according to the invention. It relates in particular to an aircraft comprising at least one piloting member connected to at least one flying member—in particular at least one control surface or at least one engine—of the aircraft in order to control the operation thereof—in particular the position and displacements—, wherein it comprises at least one piloting device according to the invention for controlling at least one flying member of the aircraft.

The invention also relates to a piloting device and an aircraft characterised in combination by all or part of the features mentioned above or below.

BRIEF DESCRIPTION OF THE DRAWINGS

Other objects, features and advantages of the invention will become apparent on reading the following description of one of its preferred embodiments given without limitation and with reference to the appended figures in which.

DETAILED DESCRIPTION OF THE INVENTION

A piloting device according to the invention shown in the figures comprises a piloting member 11 which, in the example, is a mini-stick for piloting an aeroplane, mounted and guided to pivot with respect to a frame 12 fixed with respect to the aeroplane cabin by a mechanism 13, called a cardan mechanism, defining a centre-point rotary joint, comprising a cradle 14, a pivot axis 15 for pitch pivoting a lower end 17 of the mini-stick 11 with respect to the cradle 14, and a pivot axis 16 for roll pivoting of the cradle 14 with respect to the frame 12. The pivot axes 15, 16 are at least substantially orthogonal—in particular preferably strictly orthogonal—and at least substantially intersecting—i.e. either intersecting, or slightly offset with respect to one another but by a sufficiently small distance as not to substantially change the behaviour of the piloting member in rotation, so that the mechanism defines a perfect or slightly imperfect centre-point type rotary joint. Such a mechanism 13 for mounting and guiding in rotation an aeroplane mini-stick is well known per se and does not need to be described in more detail.

The mini-stick 11 has an upper part 18 which forms a handle adapted to be capable of being manipulated by a pilot, and a lower part 17 coupled to said mechanism 13. Between the upper part 18 and the lower end 17 of the mini-stick 11, the piloting device comprises a force sensor 19 in the form of strain gauges, constituted mainly, in the example shown, by a plane membrane 20 overall parallel to the pitch rotation axis 15 and roll rotation axis 16, and having four openings 21, so that this membrane 20 is flexurally deformed according to the value of the torque imparted on the handle 18 by the pilot, in pitch or in roll. Such a force sensor 19 in the general form of a plane membrane may have other embodiment variants, for example in the form of a membrane provided with a circular groove provided between recesses with respect to its lower face.

The membrane 20 has a central opening 22 which enables its rigid fixing to the lower end 17 of the mini-stick 11. The openings 21 of the membrane 20 are evenly distributed about the central opening 22 so that the membrane 20 has four flexurally deformable radii 30, 31, of which two radii 30 are orthogonal to the pitch rotation axis (15), one on each side of the central opening 22, and two radii 31 are orthogonal to the roll rotation axis 16, one on each side of the central opening 22.

At the periphery of the membrane 20, four internal screw threads 23 enable the fixing of the handle 18 to this membrane 20. Thus, the membrane 20 is rigidly fixed integrally with the mini-stick 11 and extends transversely to the latter, i.e. tangentially to the pitch pivot axis 15 and roll pivot axis 16. The membrane 20 has a peripheral edge 29 extending orthogonally to the main plane of the membrane 20.

The radii 30, 31 are each provided with an electrical resistance suitable for constituting a flexural strain gauge. Furthermore, the membrane 20 is electrically connected to an electrical circuit (not shown) adapted to measure the variations in electrical resistance of each of the radii 30, 31 according to its flexural deformation. For example, the electrical resistances of the radii 30, 31 are arranged in a Wheatstone bridge circuit. Such a sensor with four gauges enables greater precision than a sensor with only one gauge. Two opposite nodes of the Wheatstone bridge are supplied with a DC voltage and the voltage is measured at the two other opposite nodes. The voltage between these two latter nodes is low, the electrical circuit consisting essentially of an amplifier.

According to another possible embodiment variant, the force sensor 19 may be embodied in the form of a magneto-strictive sensor. To this end, the radii 30, 31 are produced from premagnetised ferromagnetic material (steel . . . ). Such a ferromagnetic material exhibits a converse magnetostrictive effect, called a magnetomechanical effect, which is characterised by the modification of the magnetic susceptibility in the presence of mechanical stresses in the material. By adding magnetic field sensors (Hall effect sensors or others), the stress, hence the force, is measured directly.

The cradle 14 has two lateral end plates 24, between which the lower end 17 of the mini-stick 11 is articulated on the pitch rotation axis 15. The two lateral end plates 24 are parallel to one another and of the same shapes and dimensions. They define, at the front and at the rear, front stops 25 and rear stops 26 respectively, limiting the amplitude of angular deflection of the mini-stick 11 in pitch about the pitch rotation axis 15.

The front stop 25 of each end plate 24 is formed of an upwardly projecting shoulder of the end plate 24 adapted to have a plane wall portion which extends in a plane parallel to the pitch rotation axis 15 and is oriented rearwards slightly inclined upwards so as to be able to receive a portion of the peripheral edge 29 of the membrane 20 of the force sensor 19, this portion serving as a front contact bearing surface 32 for the front stop 25. Thus, the peripheral edge 29 of the membrane 20 has, towards the front, two plane front bearing surfaces 32 adapted to come into contact with the two front stops 25 of the two end plates 24 of the cradle 14.

The rear stop 26 of each end plate 24 is also formed of an upwardly projecting shoulder of the end plate 24 adapted to have a plane wall portion which extends in a plane parallel to the pitch rotation axis 15 and is oriented forwards slightly inclined upwards so as to be able to receive a portion of the peripheral edge 29 of the membrane 20 of the force sensor 19, this portion serving as a rear contact bearing surface 33 for the rear stop 26. Thus, the peripheral edge 29 of the membrane 20 has, towards the rear, two plane rear bearing surfaces 33 adapted to come into contact with the two rear stops 26 of the two end plates 24 of the cradle 14.

It should be noted that the stops 25, 26 formed by the cradle 14 limit well the pitch displacement of the mini-stick 11, owing to the fact that the cradle 14 is itself integral with the frame 12 with regard to the pitch pivoting, and can pivot with respect to the frame 12 only about the roll rotation axis 16.

Furthermore, the frame 12 has an opening 34, through which passes the lower end 17 of the mini-stick 11, the cradle 14 being articulated to the frame 12 below this opening 34. The opening 34 defines, on the left and on the right of the mini-stick 11, left stops 35 and right stops 36 respectively, limiting the amplitude of angular deflection of the mini-stick 11 in roll about the roll rotation axis 16.

The left stop 35 is formed of a plane wall portion which extends in a plane parallel to the roll rotation axis 16 and is oriented towards the right slightly inclined upwards so as to be able to receive a portion of the peripheral edge 29 of the membrane 20 of the force sensor 19, this portion serving as a left contact bearing surface 37 for the left stop 35. Thus, the peripheral edge 29 of the membrane 20 has, towards the right, a central projecting portion defining a left plane bearing surface 37 adapted to come into contact with the left stop 35 of the frame 12.

The right stop 36 is formed of a plane wall portion which extends in a plane parallel to the roll rotation axis 16 and is oriented towards the left slightly inclined upwards so as to be able to receive a portion of the peripheral edge 29 of the membrane 20 of the force sensor 19, this portion serving as a right contact bearing surface 38 for the right stop 36. Thus, the peripheral edge 29 of the membrane 20 has, towards the left, a central projecting portion defining a right plane bearing surface 38 adapted to come into contact with the right stop 36 of the frame 12.

Figure 1:
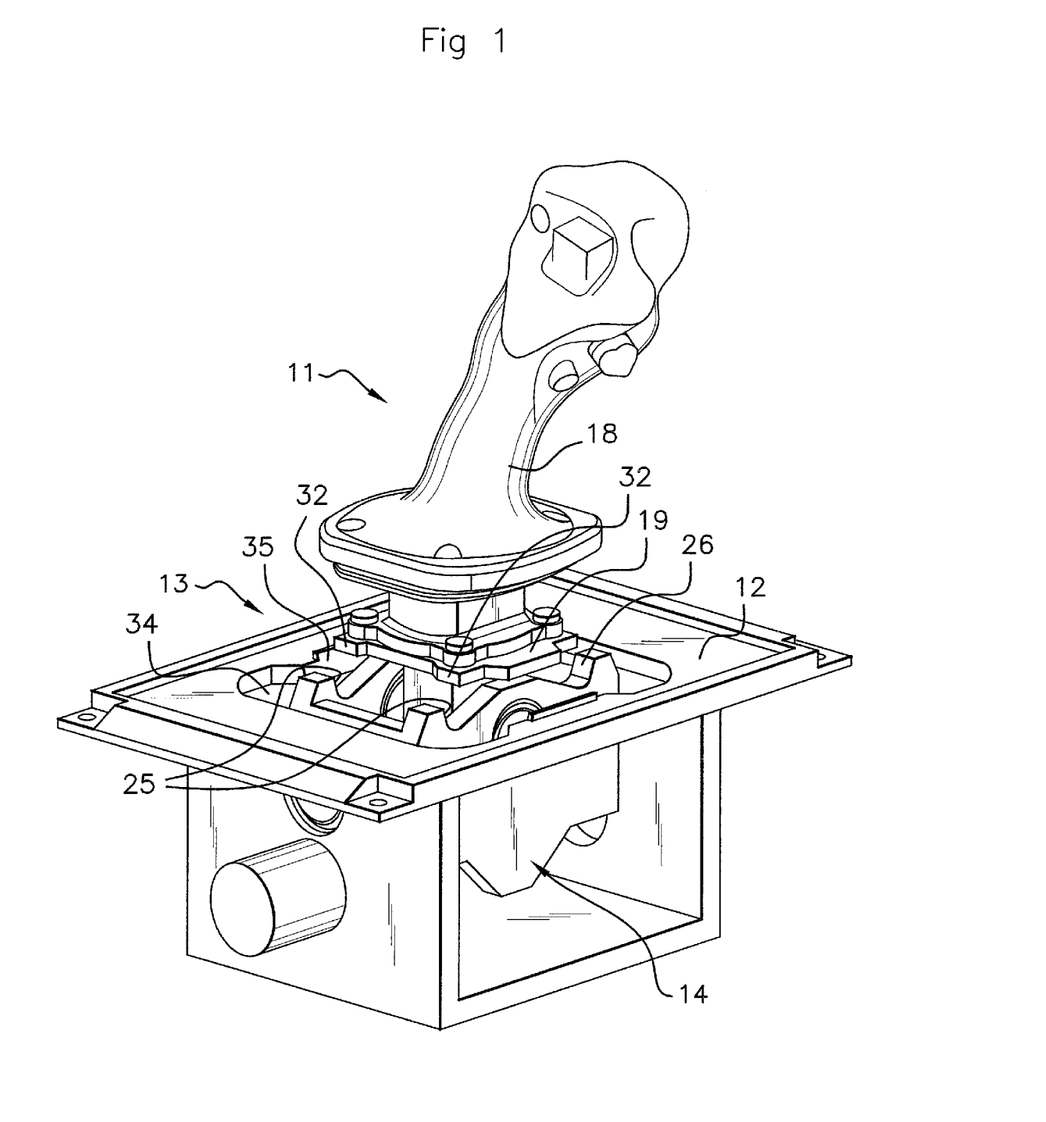
FIG. 1 is a schematic perspective view of a piloting device with a mini-stick according to the invention.
Figure 2:
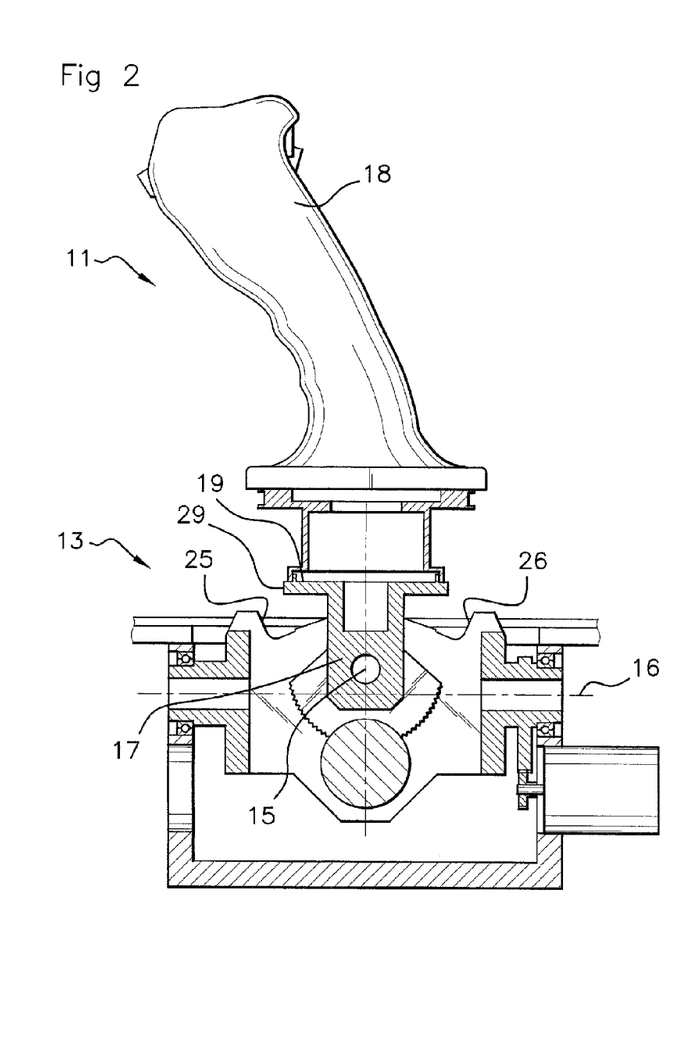
FIG. 2 is a schematic view from the left in partial vertical section on the roll axis of the device of FIG. 1.
Figure 3:
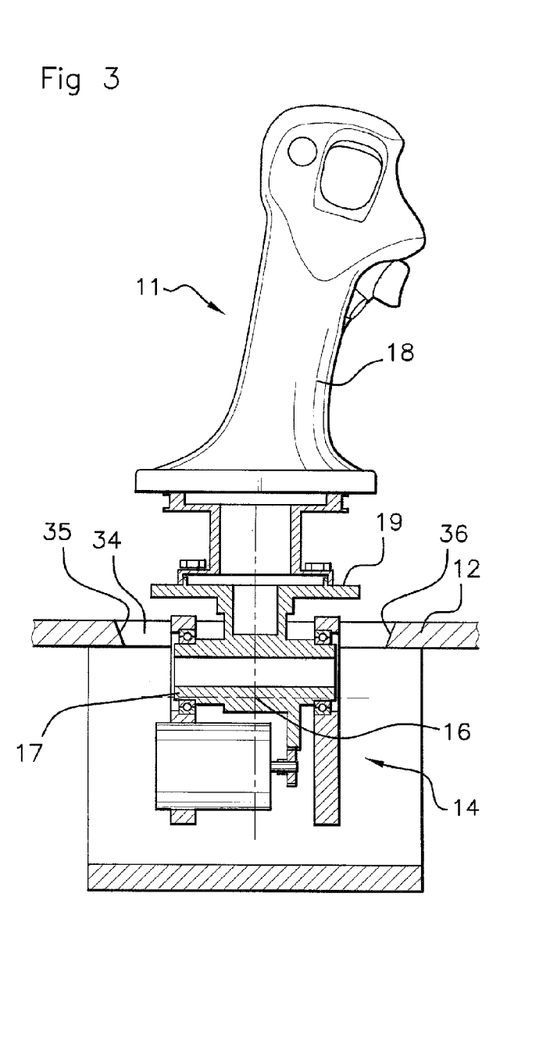
FIG. 3 is a schematic view from the rear in partial vertical section on the pitch axis of the device of FIG. 1.
Figure 4:
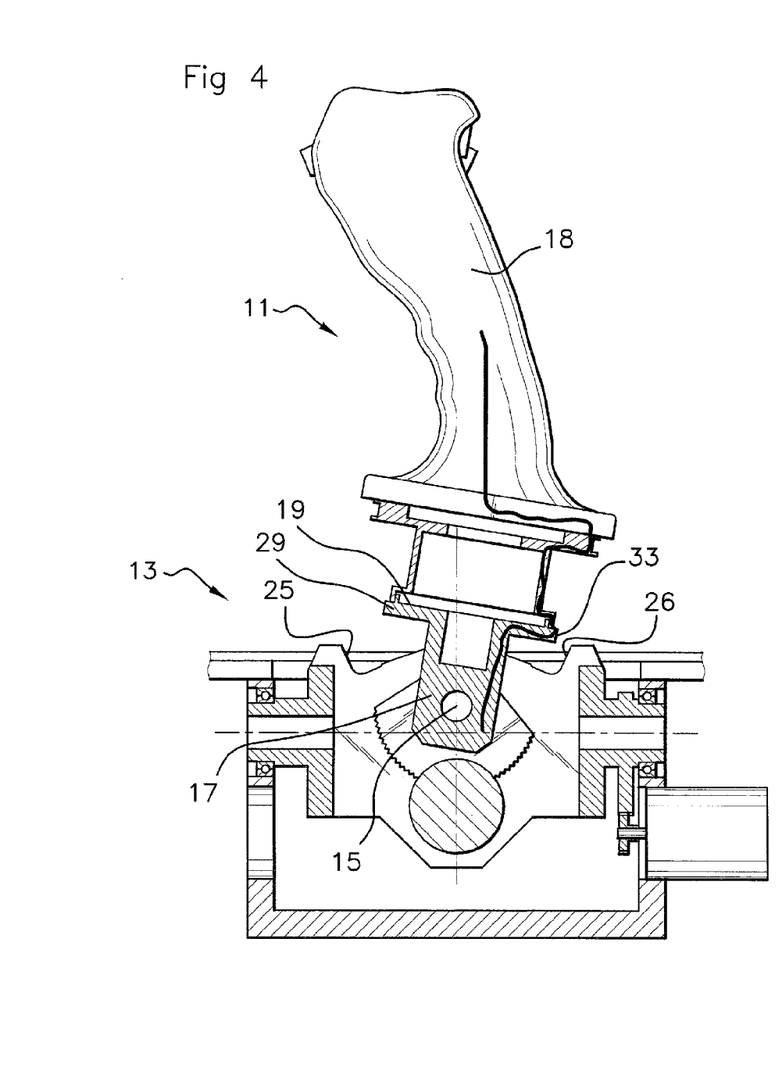
FIG. 4 is a view similar to FIG. 2 showing the piloting member in intermediate position towards the rear stop.
Figure 6:
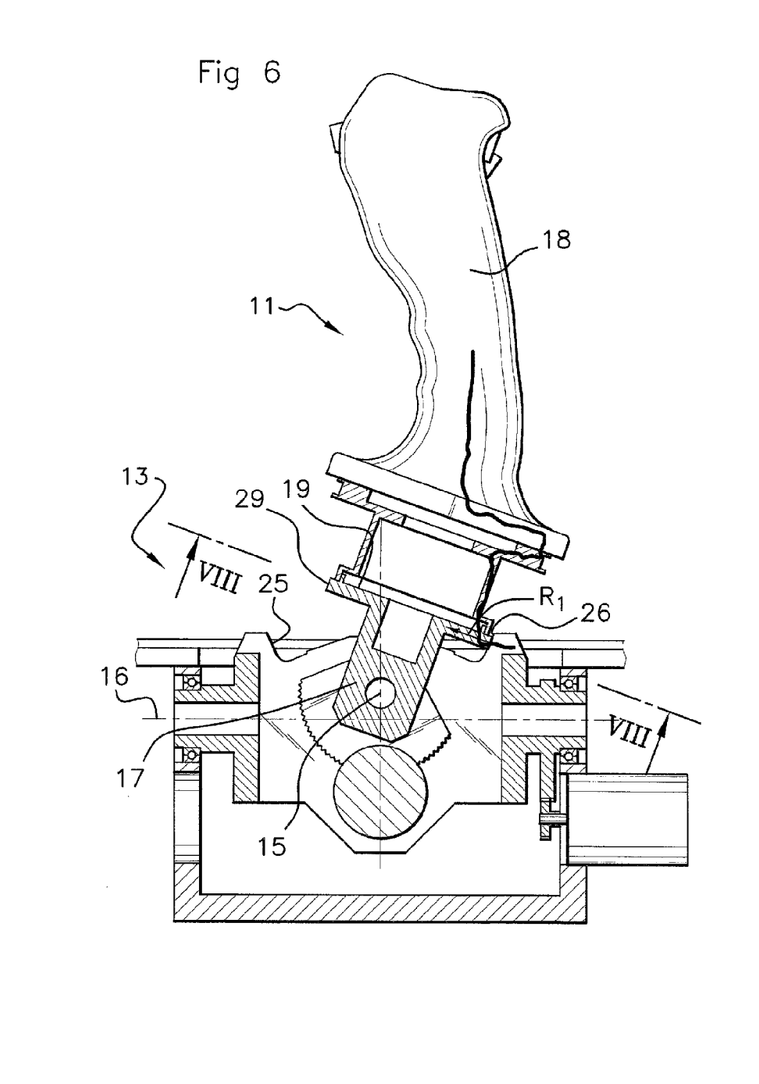
FIG. 6 is a view similar to FIG. 2 showing the piloting member at the rear stop.
Figure 8:
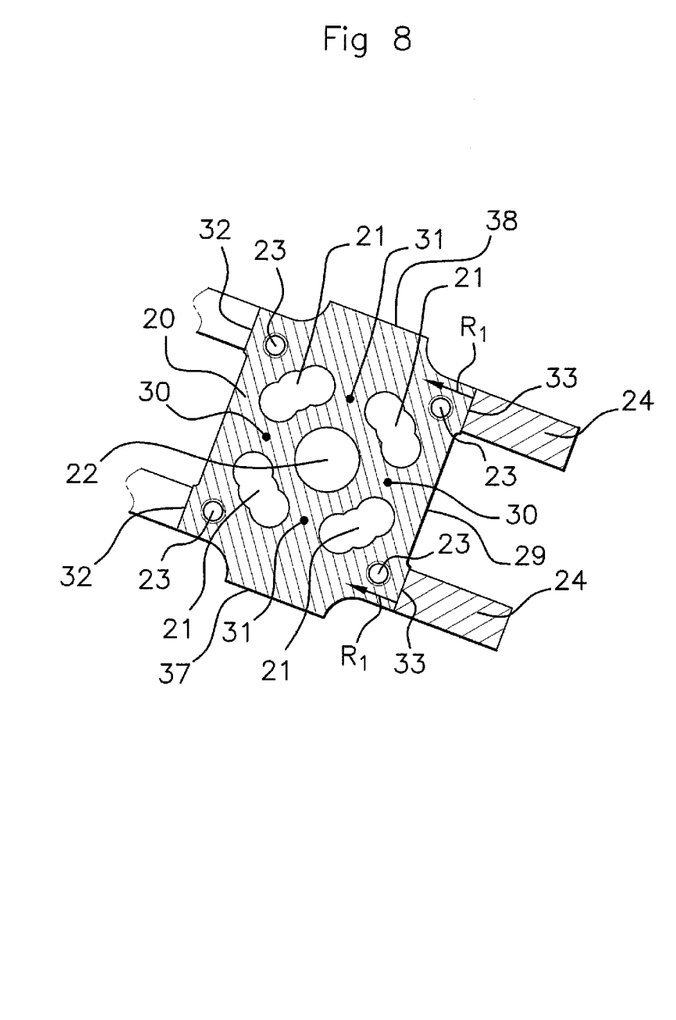
FIG. 8 is a sectional view with respect to the line VIII-VIII of FIG. 6.

The stops 25, 26, 35, 36, and the corresponding bearing surfaces 32, 33, 37, 38 extend orthogonally to the main plane of the membrane 20 when the mini-stick 11 is in abutment. Consequently, as shown in FIGS. 4, 6 and 8, the contact zone between a rear stop 26 and a rear bearing surface 33 is situated at the level of the plane of the membrane 20, and the abutment reaction R1 in pitch is oriented in the main plane of the membrane 20, in a tangential direction with respect to the pitch rotation axis 15, and stresses this membrane 20 in longitudinal compression/shearing, mainly outside its flexural deformation mode, so that the value of the abutment reaction R1 does not flexurally deform the radii of the membrane 20 and is not substantially measured by the force sensor 19. The force path schematised in FIGS. 4 and 6 by a bold-line curve passes through the membrane 20 in order to flexurally deform it in the intermediate position (FIG. 4), but no longer passes through the membrane 20 in the rear abutment position (FIG. 6).

Figure 5:
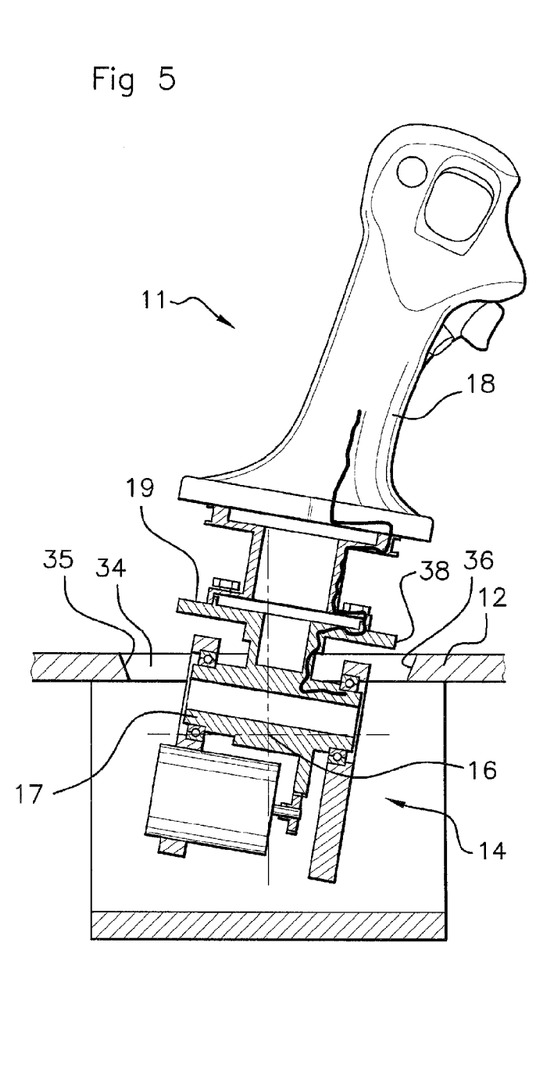
FIG. 5 is a view similar to FIG. 3 showing the piloting member in intermediate position towards the right stop.
Figure 7:
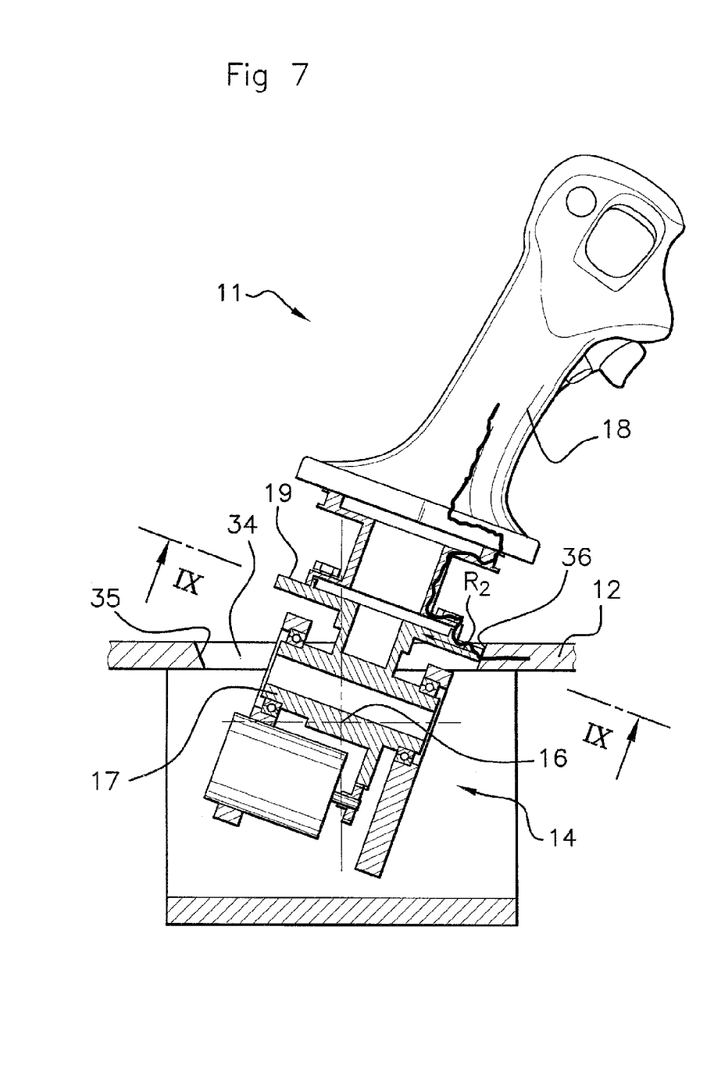
FIG. 7 is a view similar to FIG. 3 showing the piloting member at the right stop.
Figure 9:
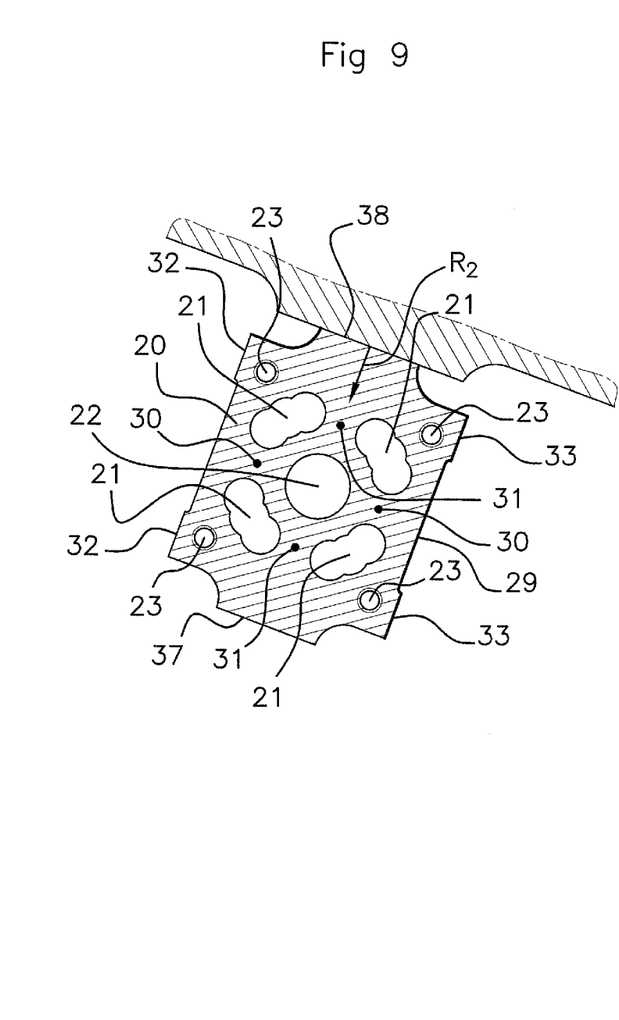
FIG. 9 is a sectional view with respect to the line IX-IX of FIG. 7.

Likewise, as shown in FIGS. 5, 7 and 9, the contact zone between a right stop 36 and a right bearing surface 38 is situated at the level of the plane of the membrane 20, and the abutment reaction R2 in roll is oriented in the main plane of the membrane 20, in a tangential direction with respect to the roll rotation axis 16, and stresses this membrane 20 in longitudinal compression/shearing, mainly outside its flexural deformation mode, so that the value of the abutment reaction R2 does not flexurally deform the radii of the membrane 20 and is not substantially measured by the force sensor 19. The force path schematised in FIGS. 5 and 7 by a bold-line curve passes through the membrane 20 in order to flexurally deform it in the intermediate position (FIG. 5), but no longer passes through the membrane 20 in the right abutment position (FIG. 7).

The same is true as far as the front stop and the left stop are concerned. In other words, for each stop of the piloting member, the abutment reaction has a negligible, or even zero, component with regard to the flexural deformation mode of the membrane 20 of the force sensor 19. With a device according to the invention, the force path clearly passes through the membrane 20 in order to stress it in flexural deformation, so as to enable the measurement of the forces, in any position of the piloting member other than an abutment position, and for each abutment position of the piloting member in either direction, the force path no longer passes through the membrane 20, and no longer stresses it flexurally.

An aircraft according to the invention comprising at least one such piloting device can be certified without risk of damage to each force sensor, but is equipped with a reliable and precise force sensor at each piloting member. It is therefore possible to stress the piloting member in abutment with a much greater force than the nominal operational force, for example for certification purposes, and to do so without risk of damaging the force sensor 19.

EXAMPLE

A force sensor 19 as shown in FIGS. 8 and 9 is produced with a membrane 20 made of metallic material having a length of 82 mm between the lateral bearing surfaces 37, 38, and a width of 64 mm between the front and rear bearing surfaces 32, 33. The deformable central part delimited by the openings 21 is circumscribed in a circle with a diameter of the order of 54 mm. The thickness of the membrane 20 depends on the metallic material which may be chosen in particular from a steel, a titanium alloy or an aluminium alloy. In the case of an aluminium alloy, the membrane 20 has for example a thickness of 5 mm.

In the case where the piloting device is a mini-stick as shown in the figures, the force values are as follows:
  in depth (pitch):
    maximum operational force: 10 daN to 30 daN at the reference point of the handle defined by the position of the index finger of the hand,
    maximum certification force without deformation in abutment: 90 daN,
    maximum certification force without rupture in abutment: 135 daN.
  in warping (roll):
    maximum operational force: 4 daN to 15 daN at the point of reference of the handle defined by the position of the index finger of the hand,
    maximum certification force without deformation in abutment: 46 daN,
    maximum certification force without rupture in abutment: 69 daN.

These certification force values were applied in a piloting device according to the invention with the sensor 19 described above, without damaging the latter.

The invention may have numerous embodiment variants and diverse applications other than those shown in the figures and described above. In particular, the invention applies to other types of piloting members, and to other types of force sensors. There is nothing to prevent provision for a plurality of force sensors for a same piloting member, since the abutment reactions can be oriented so as not to stress the different force sensors in deformation.

The invention claimed is:

1. A piloting device for piloting an aircraft comprising:
  a piloting member (11) suitable for being actuated by a pilot,
  a mechanism (13) for mounting and guiding in rotation the piloting member (11) about at least one rotation axis (15, 16) with respect to a frame (12),
  stops (25, 26, 35, 36) adapted to limit angular amplitude of rotation of the piloting member (11) with respect to the frame,
  at least one force sensor (19) connected to the piloting member (11) upstream of said mechanism (13), and comprising at least one sensing element (20) deformable according to deformation modes corresponding to the measurement of at least one component of forces imparted by a pilot on the piloting member (11),
  wherein:
  said stops (25, 26, 35, 36) are arranged so as to cooperate with bearing surfaces (32, 33, 37, 38) integral with the piloting member (11) upstream of said mechanism (13),
  said at least one force sensor (19), said stops (25, 26, 35, 36), and said bearing surfaces (32, 33, 37, 38) are arranged with respect to one another so that each contact of one of said bearing surfaces (32, 33, 37, 38) with a respective one of said stops (25, 26, 35, 36) generates an abutment reaction (R1, R2), the orientation of which with respect to each said at least one sensing element (20) of said at least one each force sensor (19) is such that said abutment reaction (R1, R2) stresses the respective said sensing element (20) at least substantially outside the deformation modes of the respective said sensing element (20).

2. The device as claimed in claim 1, wherein the sensing element (20) comprises a flexurally deformable membrane which is planar at rest and extends tangentially with respect to at least one rotation axis (15, 16) of the piloting member, wherein said stops (25, 26, 35, 36) and said bearing surfaces (32, 33, 37, 38) are arranged so as to come into contact with one another in contact zones situated in a plane containing a plane of said deformable membrane, and wherein said stops and said bearing surfaces are oriented so as to produce abutment reactions (R1, R2) oriented in the plane of said deformable membrane.

3. The piloting device as claimed in claim 2, wherein for each rotation axis (15, 16), at least one of said stops (25, 26, 35, 36) and the corresponding bearing surface (32, 33, 37, 38) of the piloting member (11) has a face extending in a plane parallel to the rotation axis (15, 16).

4. The piloting device as claimed in claim 3, wherein each bearing surface (32, 33, 37, 38) is a peripheral wall portion of the force sensor.

5. The piloting device as claimed in claim 3, wherein said mechanism (13) is adapted to define a rotary joint on two rotation axes (15, 16) at least substantially orthogonal with respect to the frame (12).

6. The piloting device as claimed in claim 2, wherein each of said bearing surfaces (32, 33, 37, 38) is a peripheral wall portion of the force sensor.

7. The piloting device as claimed in claim 2, wherein said mechanism (13) is adapted to define a rotary joint on two rotation axes (15, 16) at least substantially orthogonal with respect to the frame (12).

8. The piloting device as claimed in claim 1, wherein each bearing surface (32, 33, 37, 38) is a peripheral wall portion of the force sensor.

9. The piloting device as claimed in claim 8, wherein said mechanism (13) is adapted to define a rotary joint on two rotation axes (15, 16) at least substantially orthogonal with respect to the frame (12).

10. The piloting device as claimed in claim 1, wherein said mechanism (13) is adapted to define a rotary joint on two rotation axes (15, 16) at least substantially orthogonal with respect to the frame (12).

11. The piloting device as claimed in claim 10, wherein the force sensor (19) is adapted to measure forces according to different rotation movements of the piloting member (11), the force sensor (19) being interposed between the piloting member and said mechanism.

12. The piloting device as claimed in claim 1, further comprising an aircraft in which the piloting device is operably connected.

13. The piloting device as claimed in claim 12, wherein the piloting device is operably connected to at least one of a control surface and an engine of the aircraft in order to control operation thereof.

* * * * *